(No Model.)

J. W. MELVIN & W. H. CLUTE.
CAR WHEEL.

No. 295,790. Patented Mar. 25, 1884.

WITNESSES
T. S. Norton
C. S. Stone.

INVENTORS
J. W. Melvin & W. H. Clute
By H. N. Jenkins
Attorney

UNITED STATES PATENT OFFICE.

JOSIAH W. MELVIN AND WILLIAM H. CLUTE, OF HOUSTON, TEXAS, ASSIGNORS OF TWO-THIRDS TO ABRAHAM H. SWANSON AND JAMES McGEE, BOTH OF SAME PLACE.

CAR-WHEEL.

SPECIFICATION forming part of Letters Patent No. 295,790, dated March 25, 1884.

Application filed November 28, 1883. (No model.)

*To all whom it may concern:*

Be it known that we, JOSIAH W. MELVIN and WILLIAM H. CLUTE, citizens of the United States, residents of the city of Houston, Harris county, and State of Texas, have invented a certain new and useful Improvement in Railway-Car Wheels; and we do hereby declare the following to be a full, clear, and correct description of the same, reference being had to the annexed drawings, making a part of this specification.

This invention consists in the combination, with a railroad-car axle having wheel-bearings of equal diameter throughout their whole lengths, of wheels the peripheries of which are provided with central flanges dividing each into two treads, the said wheels adapted to be pressed on the bearings aforesaid, and to be removed therefrom, reversed, and again pressed thereon whenever the wear of the first tread shall render the same necessary.

Figure 1:
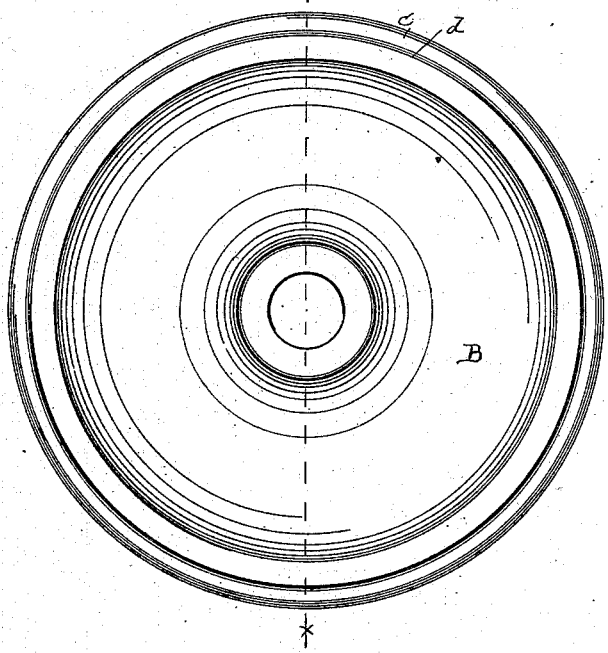
Figure 2:
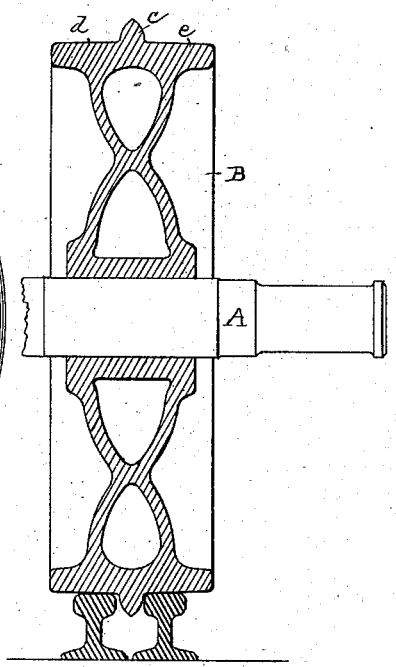

In the accompanying drawings, Figure 1 represents a side view of one of our wheels, and Fig. 2 a cross-section through the line $xx$ thereof. In the latter figure the wheel is shown as when mounted on the end of an axle and resting on the two rails of a frog.

On the drawings, the letter A designates the car-axle, and B a wheel, having a central flange, $c$, around the periphery thereof for the purpose of securing thereto two treads, as shown at $d$ $e$. The wheels are made sufficiently wide to give each tread the uniform width of wheels as at present employed, and are bored perfectly true in order that either side may be faced inward, and for a like purpose the wheel-bearings of the axles are of equal diameters throughout their whole lengths.

Heretofore in the manufacture of car-wheels they have been made with but one tread, the flange being at one side thereof. When these treads are worn out or become flat, the wheel is unfit for further service and useless, except as scrap.

The advantages of our wheel over those in general use is that when one tread becomes worn or unfit for use the wheel can be pressed off the axle and again forced thereon in a reversed position, making it in all respects as good as new, thus doubling the life of the wheel at but a small increase in weight and cost. With a wheel of this kind the liability to accident from a broken flange is prevented, and in passing through a frog the inner tread will run over the wing thereof, thus preserving the frog-point and preventing the concussions and consequent battering and wearing out of the frogs and switches. Furthermore, in crossing the track of another line at other than a right angle, the unpleasant jarring will in consequence be prevented.

We are aware that car-wheels have been constructed with central flanges and double treads, as shown in patent to James, 1878, and with two flanges and three treads, as shown in patent to Nobles, 1868, the former for operating on a grooved or double rail, and the latter having its flanges to operate at each side of a single rail. Therefore we do not claim, separately, a wheel constructed as shown and described; but, Having described our invention, what we claim as new, and desire to secure by Letters Patent, is—

The combination, with a railroad-car axle having wheel-bearings of equal diameters throughout their whole lengths, of wheels the peripheries of which are provided with central flanges, dividing each into two treads, said wheels adapted to be pressed on the aforesaid bearings with either side innermost, substantially as described, and for the purpose set forth.

In testimony whereof we affix our signatures in presence of two witnesses.

JOSIAH W. MELVIN.
WILLIAM H. CLUTE.

Witnesses:
R. LOCKART, Jr.,
T. W. ARCHER.